United States Patent [19]

Bradlee

[11] Patent Number: 4,801,102
[45] Date of Patent: Jan. 31, 1989

[54] METHOD OF MANUFACTURING COATED ROLLS

[75] Inventor: Charles R. Bradlee, Sidney, Ohio

[73] Assignee: Monarch Machine Tool Co., New Bremen, Ohio

[21] Appl. No.: 112,177

[22] Filed: Oct. 22, 1987

[51] Int. Cl.⁴ .............................................. B21F 3/00
[52] U.S. Cl. ..................................... 242/7.02; 29/120
[58] Field of Search ................... 242/7.01, 7.02, 7.21, 242/7.23, 7.19; 29/120

[56] References Cited

U.S. PATENT DOCUMENTS

| | | | |
|---|---|---|---|
| 75,292 | 3/1868 | Moulton | 29/129 X |
| 77,518 | 5/1868 | Moulton | 29/127 X |
| 84,208 | 11/1868 | Moulton | 242/7.01 X |
| 533,356 | 1/1895 | Hoffman | 29/120 |
| 1,719,647 | 7/1929 | Booth | 29/120 |

Primary Examiner—Daniel P. Stodola
Assistant Examiner—Katherine Matecki
Attorney, Agent, or Firm—Smith & Schnacke

[57] ABSTRACT

A method of manufacturing a roll coated with an absorbent, compressible material and used to support strip metal includes the steps of selecting a roll body having a rigid, cylindrical outer surface, attaching a leading end of a line to the outer surface, selecting a first elongate strip of compressible material, forming the strip into a V-shape, placing the line along the crotch of the V-shape, winding the line and the strip onto the outer surface such that the longitudinal edges of the strip extend in a substantially radial direction, and finally attaching the trailing end of the line to the roll body. In a preferred embodiment, the line is wound in a helical path from one end of the body to the other, and, simultaneously, the windings of the line and strip material are urged sidewardly in an axial direction to compress the strip to form a continuous surface. In other preferred embodiments, a second strip of compressible, absorbent material is inserted between the segments of the V-shape of the first strip as it is wound onto the roll, or in between successive windings of the first strip. Also, the first strip may be made of a thin, strong web and a second strip used which is made of a soft, absorbent material and is inserted along the fold of the first strip. The method contemplates using strips made of porous, material such as a felt of wool, cotton, plastic fiber, or the like.

20 Claims, 2 Drawing Sheets

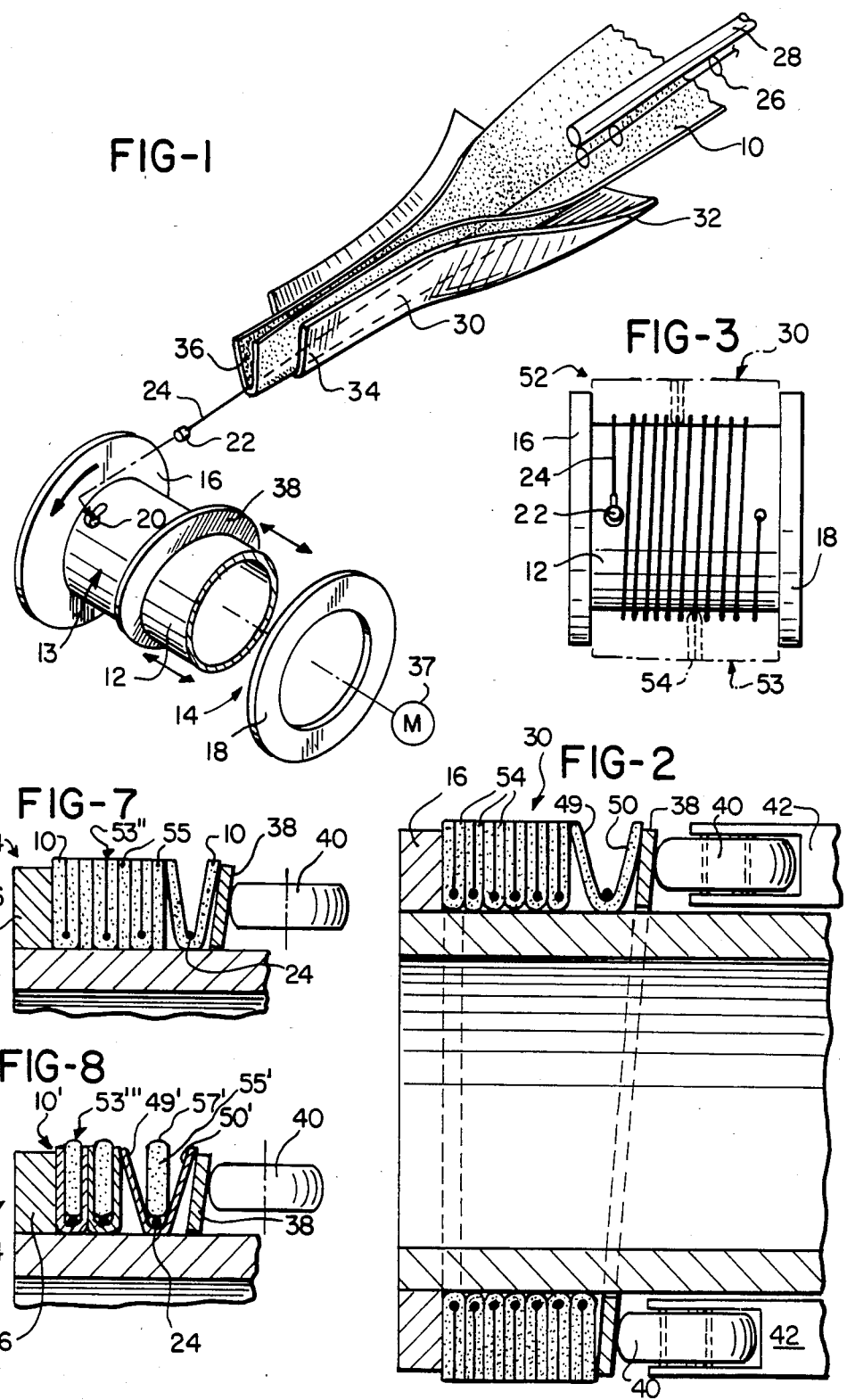

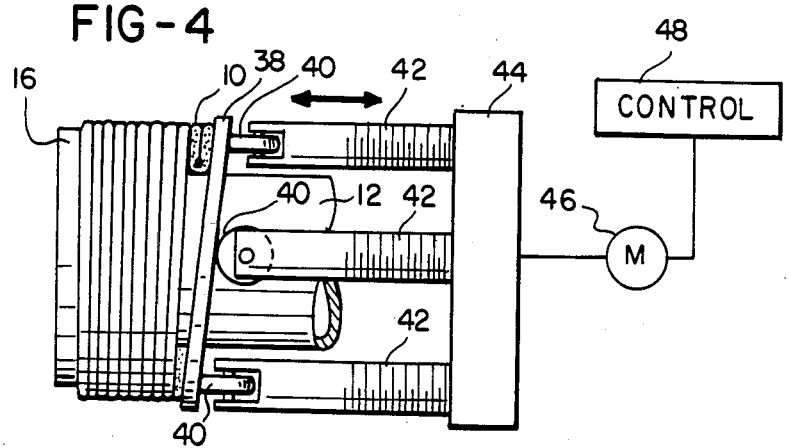
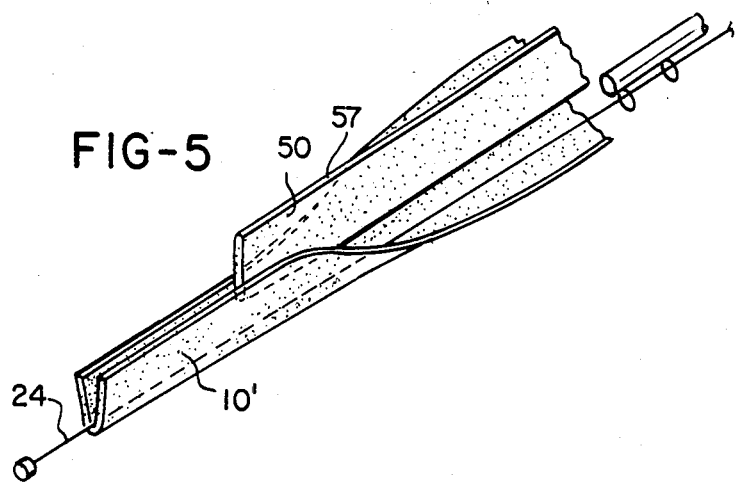
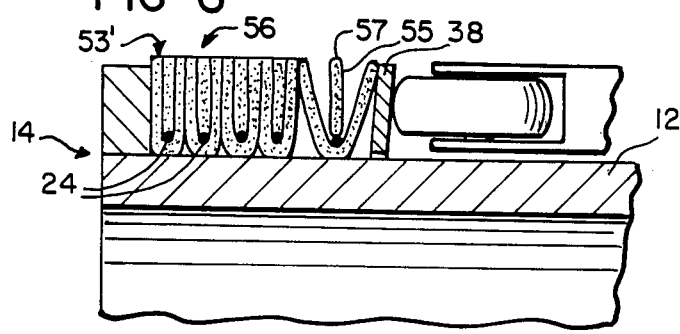

METHOD OF MANUFACTURING COATED ROLLS

BACKGROUND OF THE INVENTION

The present invention relates to methods of manufacturing a coated roll, and more particularly, methods of manufacturing a roll coated with a compressible felt material of the type for supporting strips of sheet metal.

Many manufacturing processes require the use of cylindrical rolls surfaced with a relatively soft material such as an elastomer. For example, in sheet metal processing, such soft rolls are often used to support moving strips of sheet metal without marring or gouging its surface.

However, in some instances it is desirable to form the surface of the roll of a porous material such as a felt of wool, cotton, plastic fiber, or the like. While such porous surfaces are also used to prevent the marring or gouging the material transported, they are also used to clean the surface of the material by removing oil or other liquids which may be present. When coated with an abrasive, such porous surfaces can perform a polishing action on the surface of the material conveyed. Porous rolls are also used as friction bridles for processing strip metal.

Numerous methods exist for the manufacture of cylindrical surfaces from a felt of fibers. However, the presently known techniques have the disadvantage in that the resulting rolls are relatively expensive and mechanically weak. Accordingly, there is a need for a method of manufacturing rolls coated with a felt material which is relatively inexpensive and sufficiently strong to stand up to the stresses encountered in processing sheet steel.

SUMMARY OF THE INVENTION

The present invention is a method for manufacturing coated rolls, especially rolls coated with a relatively soft felt material, which is relatively inexpensive and can be applied to a roll body having a rigid, cylindrical outer surface so that the inherent strength of the completed roll is sufficient to withstand the stresses encountered in conveying strip steel under tension. The method includes the steps of selecting a roll body having a rigid, cylindrical outer surface, attaching a leading end of a line to the outer surface, selecting a strip of material and folding the strip into a V-shape, placing the line along the crotch of the V-shape of material, winding the line and the strip about the outer surface in a helical path such that the side portions of the strip extend in a radial direction on either side of the line, and attaching the trailing end of the line to the roll body.

It is preferable that, during the winding process, the line be held under tension, thus clamping the strip to the roll body, and the windings of line and strip material urged in an axial direction to compress the successive windings against each other to impart rigidity to the radially-extending edges of strip material. The resulting structure is a roll with a continuous outer surface comprising the longitudinal side surfaces of the folded strip material wound about the roll body. If a compressible felt material is selected, the outer surface of the completed roll will comprise a continuous felt surface made up of the longitudinal side surfaces of the felt strip material.

In a preferred embodiment, the line is a length of steel wire attached at its ends to the outer surface of the roll. Accordingly, the roll formed does not require adhesives or complicated attaching structure to secure the felt coating which may fail when used under the severe environmental conditions found in steel mills and which may significantly add to the cost of the roll.

Another embodiment of the method of the invention includes the additional step of inserting a second strip of material in between the folded side portions of the first strip as the line and first strip are wound about the outer surface of the roll body. The resulting structure, in which the second strip as well as the side portions of the first strip extend in a radial direction, has an increased thickness per winding resulting from the addition of the second strip along the axial length of the roll. A variation of this embodiment involves placing the second strip in between successive windings of the folded first strip.

In another embodiment of the invention, the first, folded strip comprises a relatively thin web of relatively tough, nonporous material such as nylon, and the second strip, positioned between the folds of the first strip, comprises a web of relatively weak, thick strip of porous material such as a loose felt. As the first and second strips are wound about the roller, the web acts as a substrate to support the second strip of porous material and can withstand the compressive force of the line. This type of structure is preferable if a relatively weak, porous material is selected to coat the roll because of certain desirable properties (such as absorption), but is too weak to withstand the compressive forces of the wire.

Accordingly, it is an object of the present invention to provide a method for manufacturing a coated roll coated with a compressible material which is relatively simple to perform and results in a low-cost, effective coated roll; a method in which a variety of materials may be used and attached to a roll body with sufficient strength to withstand the stresses of handling strip steel; and a method of manufacturing a coated roll which can be used to manufacture rolls of a wide variety of lengths and diameters.

Other objects and advantages will become apparent from the following description, the accompanying drawings and the appended claims.

BRIEF DESCRIPTION OF THE DRAWINGS

FIG. 1 is a perspective, schematic view showing the apparatus for performing the method of the invention;

FIG. 2 is a side elevation in section of a roll body receiving a felt coating according to the method of invention;

FIG. 3 is a schematic view of the roll of FIG. 2 in which the strip material is shown in phantom to reveal the attaching line;

FIG. 4 is a schematic side elevation showing the apparatus for compressing the felt coating on the roll body:

FIG. 5 is a schematic, perspective view of the apparatus for coating a roll showing an alternate embodiment of the method of the invention;

FIG. 6 is a detail side elevation in section showing a roll body receiving the felt covering illustrated in FIG. 4;

FIG. 7 is a second alternate embodiment showing a second strip positioned in between the windings of the first, folded strip; and FIG. 8 is a third alternate embodiment wherein the first strip is a relatively thin web and the second strip is relatively thick and is positioned in the fold of the first strip.

DETAILED DESCRIPTION OF THE PREFERRED EMBODIMENTS

As shown in FIG. 1, the method of the present invention operates to apply a strip of felt material 10 to the outer surface 12 of a cylinder 13 comprising a roll body 14. The felt material 10 preferably i a felt of wool, cotton, plastic fiber or the like. The roll body 14 preferably is made of steel and in addition to cylinder 13, o includes a pair of annular end pieces 16, 18. End piece 18 is shown exploded away from cylinder 13 in FIG. 1, but is press fitted to the end of the cylinder 13.

The outer surface 12 includes key slot 20 which receives the enlarged, leading end 22 of a line 24, preferably comprising metal wire or cable. The line 24 is payed out through the eyelets 26 of a line guide 28 and extends through a strip guide 30.

The strip guide 30 includes a rearward end 32 having a flat shape which progresses gradually to a forward o end 34 having substantially a V-shape. The felt strip 10 is payed out from a roll (not shown) and through the strip guide 30 where it is folded from a substantially flat configuration to a V-shaped configuration. The line 24 extends through the guide such that it lies in the fold or crotch 36 of the V-shape.

The strip 10 of felt material is applied to the roll body 14 by attaching the line 24 to the roll body at the slot opening 20 and rotating the roll body on a motor-driven mandrel 37. The felt strip 10 is payed out with the line 24 and is wrapped in a helical pattern about the cylindrical surface 12, as shown in FIG. 2.

As shown in FIGS. 2 and 4, in order to compress the windings sufficiently to present a continuous felted surface, an annular ring 38 is fitted about the cylindrical surface 12 of the roll body and is urged in an axial direction by a plurality of rollers 40, each of which is connected to a threaded rod 42. The threaded rods 42 are each adjustably mounted in a carrier member 44 actuated by a motor 46 operated by a computer control 48. The control 48 actuates the motor 46 to displace carrier member 44 and the o threaded rods 42 away from end piece 16 as the strip 10 of material is wound about the cylindrical outer surface 12. This allows the ring 38 to be displaced away from the end piece 16 at a controlled rate relative to the rate at which the material is wound onto the roll 14 thereby compressing the successive windings of the V-shaped strip so that the side portions 49, 50 of the strip touch each other and are compressed to extend in a radial direction. In order that the compression of the successive windings of felt material 10 be imposed gradually, it is necessary that the ring 38 be skewed relative to a central axis of the roll 14, as shown in FIGS. 1 and 2.

At the end of the winding process, the felt strip 10 and line 24 are cut and the trailing end 51 of the line is attached to the outer surface 12 of the roll body 14 as shown in FIG. 3. The annular ring 38 is then removed from the roll body 14 and annular end piece 18 is forced over the end of the cylinder 13 to maintain compression of the felt material which completes the method. As shown partially in FIG. 2 and in FIG. 3, the finished roll 52 includes a continuous, outer felted surface 53 comprised of the side surfaces 54 of the folded and compressed strip 10.

An alternate embodiment of the method of the present invention is shown in FIGS. 5 and 6. In this embodiment, the side portions 49, 50 of the felt strip 10 are folded about a second felt strip 55 so that the second strip lies in the crotch of the V-shape above the line 24.

When wound about the roll body 14, the combination of strips 10 and 55, generally designated 56, forms a helical path about the outer cylindrical surface 12 which is compressed by the ring 38 such that the side surfaces 54 of the strip 10 and the outer side surface 57 of the strip 55 provide a continuous, felted surface 53, along the length of the roll body 14. The mechanisms for attaching the leading and trailing ends of the line 24 are the same as for the embodiment of FIGS. 1-4. Although the frictional engagement 15 between the strips 10, 55 may be sufficient to hold the strip 55 within the folded strip 10, it is within the scope of the invention to bond strip 55 to strip 10 in the position shown in FIG. 6 by adhesives or other means.

An alternate method of coating a roll body 14 with the felt strips 10 and 55 of FIGS. 5 and 6 is shown in FIG. 7. In this embodiment, the strip 55 is positioned adjacent to the folded strip 10 and is sandwiched between successive windings of the folded strip. Like the embodiment of FIG. 6, the outer surface 53" comprises the side surfaces 54, 57 of the strips 10, 55. It is also within the scope of the invention of this embodiment to bond the strip 55 to the strip 10 to ensure that the strip 55 does not unravel from the roll body 14.

As shown in FIG. 8, the method of FIGS. 5 and 6, may be used in which a strip 10' comprises a relatively thin supporting web rather than felt material. This supporting web preferably is made of a material, such as nylon, having sufficient tensile properties to withstand the compressive forces of the line 24. The second, inserted strip 55, is made of a felt material having desired properties (such as absorbency) but is too weak to withstand the shearing action of the line 24. As the strips 10', 55, are wound about the roll body 14, the strip 55' is clamped between the side portions 50' of the folded web 10'. Preferably, the strip 10' is sufficiently thin such that the outer surface 53'" of the roll is substantially comprised of the side surface 57' of the strip 55'.

In order for the line 24 to hold the felt strip 10, 10, to the roll body 14, it is necessary that the retention force (the force clamping the strip 10, 10' to the roll) of the line be at a predetermined level. This level is governed by the size of the line 24 and the tension of the line as it is wound about the roll body 14.

An example of the appropriate tension and line size is illustrated in the following example for a roll constructed as shown in FIGS. 1-3 having body 14 with an outer cylindrical surface 12 having a diameter of 10 in., a desired retention force of 100 p.s.i. on the interface between the felt strip 10 and the roll body, and tensile stress in the wire of 100,000 p.s.i. In this example, the uncompressed thickness of the felt strip 10 is 0.375 in., the width is 1.50 in. and the amount of compression of the thickness as the strip when folded and wrapped about the roll body 14 is selected to be a ratio of 4 to 1.

The final depth of the felted layer will approximately equal one-half of the width of the strip, or 0.75 in., and comprises the increase in radius ($\Delta R$) of the roll. The final thickness of the folded and compressed felt material will be 0.187 in., and the outer cylindrical surface 12 will have a diameter of: 10 in.$-(2 \times \Delta R)=8.5$ in.

For a retention pressure of 100 p.s.i., the line 24 must provide: 100 p.s.i.$\times 8.5$ in.$=850$ lbs/in. Therefore, 850 must equal: 2×(number of wires per inch)×(cross-sectional area of the wire)×100,000. This results in a cross-sectional area of 0.000797 in.$^2$ for the wire line, or a wire line having a diameter of 0.032 in.

In a second example, a relatively large diameter roll is to be fitted with a felt covering comprising two strips 10, 55 as illustrated in FIG. 6. It is desired to fabricate a roll with a finished diameter of 40 in., a line retention force of 100 p.s.i. on the interface between felt roll and body, and a tensile stress in the wire of 100,000 p.s.i. The thickness of the felt material of strip 10 is 0.375 in. and of strip 55, 0.5 in. The compression ratio of the strip is selected to be 4 to 1, the thickness of second strip of material is 0.5 in. and the final depth of applied layer ($\Delta R$) is 1 in.

The final thickness of the folded and compressed materials will be: $(2(0.375)+0.50) \div 4 = 0.312$ in. and the diameter of the outer cylindrical surface 12 will be 38 in. For a retention pressure of 100 p.s.i., the wire must provide 100 p.s.i.×38 in.=3,800 lbs/in. Therefore, 3,800 equals 2×(the number of wires per inch)×(the cross-sectional area of the wire)×100,000. This yields a cross-sectional area of the wire of 0.00594 in.$^2$ for a wire diameter of 0.087 in.

While the forms of apparatus herein described constitute preferred embodiments of this invention, it is to be understood that the invention is not limited to these precise forms of apparatus and methods, and that changes may be made therein without departing from the scope of the invention.

What is claimed is:

1. A method of manufacturing a coated roll comprising the steps of:
   (a) selecting a roll body having a rigid, cylindrical outer surface;
   (b) attaching a leading end of a line to said outer surface;
   (c) selecting a first elongate strip of material, forming said first strip into a V-shape, and placing said line along a crotch of said V-shape of said first strip;
   (d) inserting a second strip of material within said V-shape such that said line lies between said crotch and said second strip;
   (e) simultaneously winding said line and said first and second strip onto said outer surface such that side portions of said first strip extend in substantially a radial direction, and urging said line and said first strip sidewardly in an axial direction relative to said roll body, thereby compressing said first strip into said V-shape sufficiently to retain said second strip securely between said side portions.

2. The method of claim 1 wherein said winding step includes winding said line and said first strip in a helical path from one end of said body to an opposite end thereof.

3. The method of claim 1 further comprising the final step of attaching a trailing end of said line to said roll body.

4. The method of claim 1 wherein said leading and trailing ends of said line are attached to said roll body adjacent to opposite ends thereof.

5. The method of claim 1 wherein said strip comprises a compressible material.

6. The method of claim 1 wherein said second strip comprises a compressible material.

7. The method of claim 1 wherein said winding step includes the step of placing said line under tension as said line and said first strip are wound about said roll body.

8. The method of claim 7 wherein said placing step includes placing said line under tension such that a retention pressure of said line against said roll body is at a predetermined level.

9. The method of claim 1 wherein said inserting step includes the step of attaching said second strip to said first strip within said V-shape.

10. The method of claim 1 wherein said first strip is made from a web of relatively thin, strong material, and said second strip is made from relatively thick, weak material.

11. A method of manufacturing a coated roll comprising the steps of:
    (a) selecting a roll body having a rigid, cylindrical outer surface;
    (b) attaching a leading end of a line to said outer surface;
    (c) selecting a first elongate strip of material, forming said first strip into a V-shape, and placing said line along a crotch of said V-shape of said first strip;
    (d) simultaneously winding said line and said first strip onto said outer surface, and inserting a second strip of material in between windings of said first strip of material such that side portion of said first strip extend in substantially a radial direction; and
    (e) urging said line, said first strip and said second strip sidewardly in an axial direction relative to said roll body, thereby compressing said first strip into said V-shape sufficiently to retain said second strip securely between said side portions.

12. The method of claim 11 wherein said winding step includes winding said line and said first strip in a helical path from one end of said body to an opposite end thereof.

13. The method of claim 11 further comprising the final step of attaching a trailing end of said line to said roll body.

14. The method of claim 11 wherein said leading and trailing ends of said line are attached to said roll body adjacent to opposite ends thereof.

15. The method of claim 11 wherein said first strip comprises a compressible material.

16. The method of claim 11 wherein said second strip comprises a compressible material.

17. The method of claim 11 wherein said winding step includes the step of placing said line under tension as said line and said first strip are wound about said roll body.

18. The method of claim 11 wherein said placing step includes placing said line under tension such that a retention pressure of said line against said roll body is at a predetermined level.

19. The method of claim 11 wherein said inserting step includes the step of attaching said second strip to said first strip within said V-shape.

20. The method of claim 11 wherein said first strip is made from a web of relatively thin, strong material, and said second strip is made from relatively thick, weak material.

* * * * *